(12) United States Patent
Crombez et al.

(10) Patent No.: US 8,066,339 B2
(45) Date of Patent: Nov. 29, 2011

(54) VEHICLE AND METHOD FOR CONTROLLING REGENERATIVE BRAKING

(75) Inventors: Dale Crombez, Livonia, MI (US); John Czubay, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1711 days.

(21) Appl. No.: 10/708,516

(22) Filed: Mar. 9, 2004

(65) Prior Publication Data
US 2005/0200197 A1  Sep. 15, 2005

(51) Int. Cl.
*B60T 8/64* (2006.01)
(52) U.S. Cl. ...................................................... 303/152
(58) Field of Classification Search .............. 303/3, 152, 303/15, 20, 155; 180/65.1–65.8, 165, 197; 701/70
See application file for complete search history.

(56) References Cited

U.S. PATENT DOCUMENTS

| | | | |
|---|---|---|---|
| 3,774,095 A | 11/1973 | Coccia | |
| 4,962,969 A | 10/1990 | Davis | |
| 5,615,933 A * | 4/1997 | Kidston et al. | 303/152 |
| 5,707,115 A | 1/1998 | Bodie et al. | |
| 5,853,229 A * | 12/1998 | Willmann et al. | 303/3 |
| 5,879,062 A | 3/1999 | Koga et al. | |
| 5,915,801 A | 6/1999 | Taga et al. | |
| 5,997,107 A | 12/1999 | Koga et al. | |
| 6,070,953 A * | 6/2000 | Miyago | 303/152 |
| 6,076,899 A | 6/2000 | Isella | |
| 6,099,089 A * | 8/2000 | Schneider | 303/152 |
| 6,126,251 A | 10/2000 | Yoshii et al. | |
| 6,177,773 B1 | 1/2001 | Nakano et al. | |
| 6,179,395 B1 | 1/2001 | Schneider | |
| 6,244,674 B1 * | 6/2001 | Kuno et al. | 303/152 |
| 6,309,031 B1 * | 10/2001 | Crombez et al. | 303/113.4 |
| 6,325,470 B1 * | 12/2001 | Schneider | 303/152 |
| 6,445,982 B1 | 9/2002 | Swales et al. | |
| 6,488,345 B1 | 12/2002 | Woody et al. | |
| 6,508,523 B2 * | 1/2003 | Yoshino | 303/152 |
| 6,691,013 B1 * | 2/2004 | Brown | 701/70 |
| 6,811,229 B2 * | 11/2004 | Soga | 303/152 |
| 2002/0180266 A1* | 12/2002 | Hara et al. | 303/152 |
| 2003/0230933 A1* | 12/2003 | Schneider et al. | 303/146 |

FOREIGN PATENT DOCUMENTS

JP  11-105688  4/1999

* cited by examiner

*Primary Examiner* — Christopher Schwartz
(74) *Attorney, Agent, or Firm* — David B. Kelley; Brooks Kushman P.C.

(57) ABSTRACT

A vehicle and a method for controlling regenerative braking are provided. To take advantage of regenerative braking, the maximum available regenerative braking torque is utilized for some time during a braking event. As the vehicle speed and/or powertrain torque decreases, the regenerative braking torque is controlled to deviate from the maximum. The point at which the regenerative braking torque deviates from the maximum is chosen based on the level of vehicle deceleration. The regenerative braking torque is then smoothly blended out until it reaches zero. The regenerative braking torque is brought to zero when the vehicle speed is very low, thereby eliminating the inefficiencies associated with operating a motor at a very low speed. This control of the regenerative braking torque provides a smooth and consistent feel to the vehicle operator.

15 Claims, 5 Drawing Sheets

VEHICLE AND METHOD FOR CONTROLLING REGENERATIVE BRAKING

BACKGROUND OF INVENTION

1. Field of the Invention

The present invention relates to a method for controlling regenerative braking in a vehicle.

2. Background Art

Electric vehicles, hybrid electric vehicles (HEV's), and indeed any vehicle that utilizes an electric machine, such as an electric motor, may be configured to use the electric machine to provide regenerative braking to at least assist in stopping the vehicle. In addition, non-electric vehicles may also be configured to provide regenerative braking, for example, through the use of a hydraulic system. Regenerative braking provides a number of advantages over using a friction braking system exclusively. For example, the use of regenerative braking, whereby an electric motor provides negative torque to the vehicle wheels, reduces wear on the friction elements of the friction braking system. In addition, during regenerative braking, the motor can function as a generator, producing electricity that can be used immediately, or stored in a storage device, such as a battery.

Because of the advantages associated with regenerative braking, current regenerative braking control systems attempt to apply the maximum regenerative braking torque so that overall vehicle efficiencies are maximized. It may be desirable to avoid this strategy, however, when the vehicle, and thus the motor, is operating at a very low speed. This is because although the motor is capable of producing very high torque at low speeds, it does so with poor efficiency. Therefore, the regenerative braking torque may be controlled to gradually reduce to zero at low vehicle speeds.

One example of a control method for a regenerative braking system is described in U.S. Pat. No. 6,508,523 issued to Yoshino on Jan. 21, 2003. The Yoshino control method controls the regenerative braking torque to emulate the braking torque of an internal combustion engine. In particular, the value of the regenerative braking torque supplied by an electric motor is almost constant when the vehicle speed is above some predetermined speed. When the vehicle speed drops below this predetermined point, the regenerative braking torque is controlled to gradually go to zero in a way that best emulates the braking torque of an internal combustion engine.

One limitation of the control system described in Yoshino is that it does not address the need to change the set point at which the regenerative braking torque begins to be reduced to zero. For example, as described above, the braking torque may be gradually blended out from some maximum available value to zero when the vehicle speed is low. There are times, however, when this strategy may result in undesirable vehicle behavior. One of these times is during heavy vehicle decelerations, where the blending out of the regenerative braking torque may become abrupt and rough. In such cases, it may be desirable to adjust the point at which the blending out of the regenerative braking torque begins. In addition, when regenerative braking is used in conjunction with friction braking, there may be times when the friction braking system experiences some reduced braking capability. In these cases, it may be desirable to begin the blending out of the regenerative braking torque at a point that is different than during a heavy deceleration.

Therefore, a need exists for a method for controlling regenerative braking in a vehicle which not only blends the regenerative braking torque from some operating level down to zero when the vehicle speed is low, but also uses different points to begin the blending out, thereby accommodating such situations as various levels of high deceleration and reduced friction braking capability.

SUMMARY OF INVENTION

Accordingly, the present invention provides a vehicle and method for controlling regenerative braking by using different points to begin or end the regenerative braking, thereby accommodating a wide variety of vehicle conditions, such as different levels of vehicle deceleration and reduced-capability friction braking. This provides advantages over vehicles and methods for controlling regenerative braking based on a single set point that is not responsive to different vehicle conditions.

The invention also provides a method for controlling regenerative braking in a vehicle having a regenerative braking system. The method includes determining a first vehicle condition when the vehicle is braking. A second vehicle condition is also determined, and the regenerative braking torque is reduced to zero. The reduction in braking torque begins when the second vehicle condition reaches a first predetermined value. The first predetermined value is based on the first vehicle condition.

The invention further provides a method for controlling a vehicle having a regenerative braking system. The method includes determining when a vehicle operator commands vehicle braking. At least regenerative braking is used to reduce a speed of the vehicle when the operator commands vehicle braking. A first vehicle condition is determined when the vehicle is braking. A second vehicle condition is determined, and regenerative braking torque is reduced, when the second vehicle condition reaches a first predetermined value. The first predetermined value is based on the first vehicle condition.

The invention also provides a vehicle including an electric machine operable to provide regenerative braking for the vehicle. At least one sensor is configured to detect a corresponding vehicle condition, and to output at least one signal related to each corresponding detected vehicle condition. A controller is in communication with the electric machine and the at least one sensor. The controller is configured to determine first and second vehicle conditions based on signals received from the at least one sensor when the vehicle is braking. The controller is further configured to command the electric machine to reduce regenerative braking torque to zero. The reduction of regenerative braking torque begins when the second vehicle condition reaches a first predetermined value. The first predetermined value is based on the first vehicle condition.

DETAILED DESCRIPTION

Figure 1:
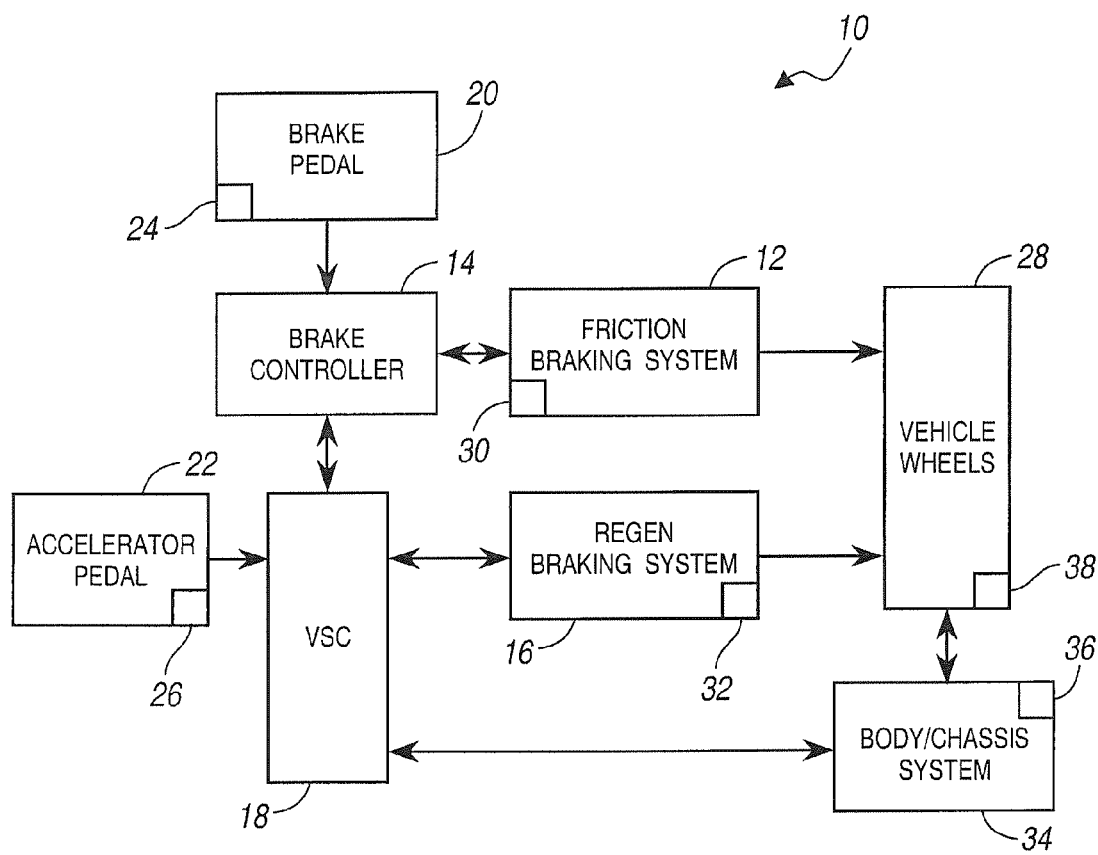
FIG. 1 shows a simplified schematic diagram of a vehicle in accordance with the present invention.

FIG. 1 shows a simplified schematic diagram of a portion of a vehicle 10 in accordance with the present invention. The vehicle 10 includes a friction braking system 12, controlled by a brake controller 14. The vehicle 10 also includes a regenerative braking system 16, which is part of the vehicle powertrain. In particular, the regenerative braking system 16 includes one or more electric machines, such as electric motors, which are operable to provide regenerative braking for the vehicle 10. The regenerative braking system 16 is controlled by a vehicle system controller (VSC) 18. The VSC 18 may include other controllers, such as a powertrain control module (PCM). In fact, the brake controller 14, shown in FIG. 1 as a separate controller, may be integrated into the VSC 18. Thus, the various systems within the vehicle 10 can be controlled by a single controller, separate software controllers within a single hardware device, or a combination of separate software and hardware controllers.

The brake controller 14 receives vehicle operator inputs from a brake pedal 20, and the VSC 18 receives operator inputs from an accelerator pedal 22. In particular, a brake sensor 24 (which can be more than one sensor), is configured to detect the position of the brake pedal 20, and send one or more signals to the brake controller 14. Similarly, an accelerator pedal sensor 26 (which can also be more than one sensor), is configured to detect the position of the accelerator pedal 22, and send one or more signals to the VSC 18. The VSC 18 and the brake controller 14 use various inputs, including the inputs from the sensors 24, 26, to decide how to control the friction braking system 12 and the regenerative braking system 16. The friction braking system 12 operates to slow the speed of vehicle wheels 28 through the application of one or more friction elements in accordance with methods well known in the art. Similarly, the regenerative braking system 16 is operable to reduce the speed of the vehicle wheels 28 by having at least one electric motor produce a negative torque which is transferred through the powertrain to the vehicle wheels 28.

The friction braking system 12 includes one or more sensors, represented in FIG. 1 by a single sensor 30. The sensor 30 is configured to send signals to the brake controller 14 related to various conditions within the friction braking system 12. For example, if the friction braking system 12 should experience reduced braking capability, perhaps due to a loss of boost or the loss of a hydraulic circuit, the sensor 30 can communicate this condition to the brake controller 14, which in turn communicates with the VSC 18. Similarly, the regenerative braking system 16 has one or more sensors, represented in FIG. 1 by the sensor 32. The sensor 32 may detect such conditions as motor speed, motor torque, power, etc. The sensor 32 communicates directly with the VSC 18, which can use these inputs in combination with the other inputs to control the braking systems 12, 16.

The vehicle 10 also includes a body/chassis system 34. The body/chassis system 34 includes structural elements of the vehicle 10, including such things as a vehicle suspension system. The vehicle wheels 28, shown separately in FIG. 1, may be considered a part of the larger body/chassis system 34. One or more sensors, shown in FIG. 1 as a single sensor 36, are configured to detect various conditions of the body/chassis system 34, and to communicate with the VSC 18. The sensor 36 may detect such conditions as the deflection of, or the load on, various elements of the body/chassis system 34. Similarly, a sensor 38, which represents one or more sensors, is configured to detect conditions of the vehicle wheels 28, including the wheel speed. The sensor 38 is shown in FIG. 1 communicating with the larger body/chassis system 34, which in turn communicates with the VSC 18. Alternatively, the sensor 38 can be directly connected to the VSC 18.

Figure 2:
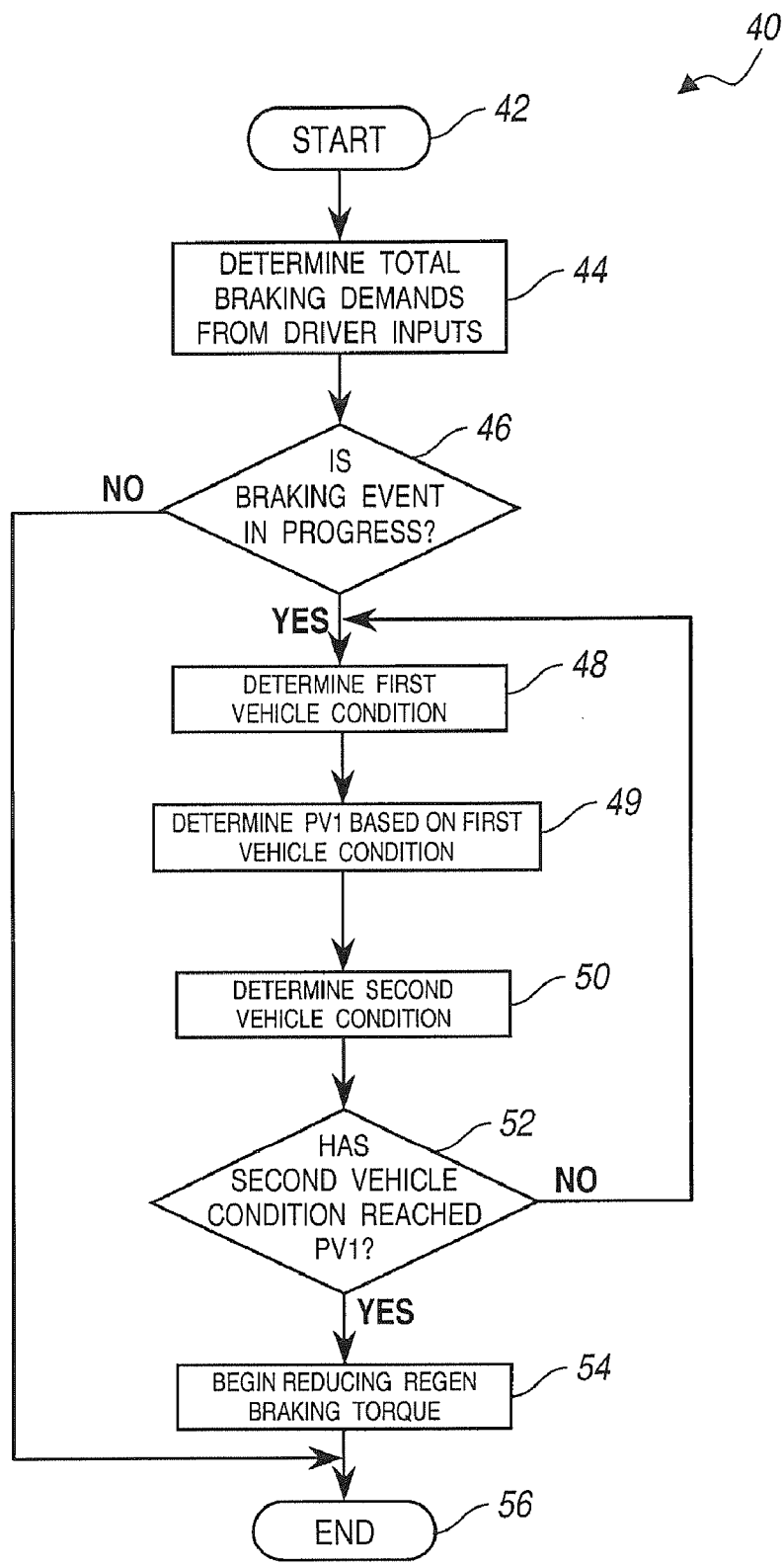
FIG. 2 shows a flowchart illustrating a method of the present invention.

FIG. 2 shows a flow chart 40 which illustrates a method in accordance with the present invention. The method begins at 42, and at step 44 the total braking demands for the vehicle 10 are determined from driver inputs. These inputs may include brake and accelerator pedal positions as detected by sensors 24, 26. The first decision is at step 46, where it is determined whether a braking event is in progress. If the inputs indicate that a braking event is not in progress, the process is ended. Conversely, if it is determined that a braking event is in progress, a first vehicle condition is determined at step 48. The first vehicle condition may be any one of a number of different vehicle conditions, such as friction brake capability, vehicle deceleration, overall braking torque—which includes both friction braking and regenerative braking—overall braking power, overall braking force, brake pedal position, suspension load, and suspension position.

At step 49, a first predetermined value (PV1) is determined. As explained in more detail below, in conjunction with FIGS. 3-7, the first predetermined value is based on the first vehicle condition, determined in step 48. Thus, the first predetermined value may be different for different vehicle conditions. This provides an advantage over systems and methods which reduce regenerative braking torque based on a single set point that is not responsive to the vehicle conditions.

At step 50, a second vehicle condition is determined, and although this occurs chronologically after steps 48 and 49 in the flow chart 40, it may in fact occur simultaneously or before either. In practice, determination of the first and second vehicle conditions may be on-going, such that the VSC 18 receives regular updates of the vehicle conditions at some predetermined frequency.

The second vehicle condition determined in step 50 can include such things as a speed of the vehicle 10, a powertrain torque, or a combination of vehicle speed and powertrain torque. The second vehicle condition is then compared to a first predetermined value at step 52. For example, if the second vehicle condition is a vehicle speed, the speed of the vehicle 10 will be monitored to determine when it has reached some predetermined speed. Because a braking event is in progress, the speed of the vehicle 10 is decreasing. Therefore, the condition in step 52 is met when the VSC 18 determines that the vehicle speed is at or below the predetermined speed. Thus, the second vehicle condition need not exactly match the first predetermined value in order for the condition at step 52 to be met.

As shown in the flow chart 40, if the second vehicle condition has not reached the first predetermined value, the method loops back to step 50, where the second vehicle condition is once again determined. If the condition at step 52 is met, the regenerative braking torque begins to be reduced at step 54. If the braking event continues, the regenerative braking torque will be reduced to zero, as described in detail below. The process is then ended, as shown in block 56, which also occurs if, at step 46, it is determined that a braking event is not in progress.

Figure 3:
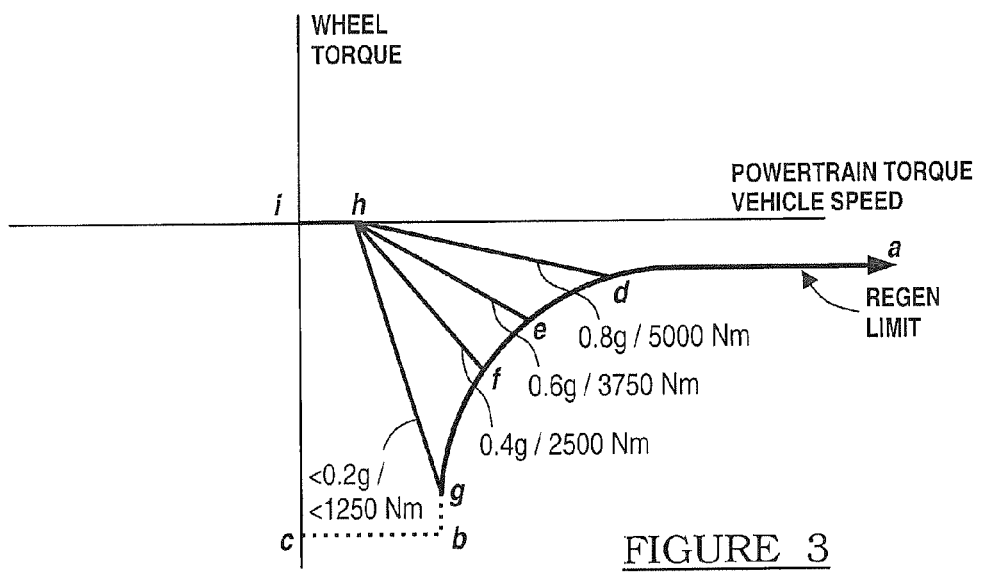
FIG. 3 shows a number of torque curves used to control regenerative braking in accordance with the present invention.

Turning to FIG. 3, the method illustrated in FIG. 2 is described in detail. Torque Curve abc represents the maximum available regenerative braking torque, or regen limit, for a vehicle, such as the vehicle 10. Because Curve abc represents braking torque, it is always negative. Therefore, as the maximum available regenerative braking torque increases, Curve abc becomes more negative.

From the graph in FIG. 3, it is clear that the amount of regenerative braking torque available increases as the vehicle speed decreases, reaching a maximum at some relatively low speed. As discussed above, operating an electric motor at very low speeds is inefficient, despite having a large amount of torque available. Therefore, regenerative braking control systems may blend out the regenerative braking torque from some value to zero, deviating from the regen limit curve, in order to reduce inefficiencies. Thus, there is a tension between the desire to use the maximum amount of regenerative braking torque available, versus the desire to reduce motor inefficiencies and provide a smooth braking experience for a vehicle operator. The present invention balances these conflicting goals by examining various vehicle conditions, and adjusting the point at which the blending of the regenerative braking torque is started—i.e., adjusting the point at which the regenerative braking torque deviates from the regen limit curve.

In addition to the regen limit curve and Curve abc, FIG. 3 also shows four additional torque curves: Curve adhi, Curve aehi, Curve afhi, and Curve aghi. The VSC 18 is configured to control the regenerative braking torque on the vehicle 10 according to torque curves similar to these. Of course, the torque curves shown in FIG. 3 represent only four possible torque curves, chosen for illustration purposes, of an infinite number of possible torque curves. Each of the torque curves in FIG. 3 corresponds to a particular first vehicle condition, such as deceleration or overall braking torque.

Specifically, Curve adhi is used when the vehicle deceleration is approximately 0.8 g, or the overall braking torque is approximately 5000 Nm. Of course, the actual braking torque is dependent on several factors, including vehicle mass; hence, the value of 5000 Nm is used here for illustrative purposes only. Similarly, Curve aehi and Curve afhi are used when the vehicle deceleration is approximately 0.6 g and 0.4 g, respectively, or the overall braking torque is approximately 3750 Nm and 2500 Nm, respectively. Curve aghi is used when the vehicle deceleration is below 0.2 g, or the overall braking torque is below 1250 Nm. For other vehicle decelerations, or other overall braking torque levels, a torque curve appropriate for the corresponding deceleration, or overall braking torque, will be used.

It is worth noting that a torque curve corresponding to a vehicle deceleration of 0.8 g does not need to be coincident with a torque curve corresponding to an overall braking torque of 5000 Nm. The same is true for the other three torque curves. The dual labels of deceleration and overall braking torque are used merely for illustrative purposes, and do not necessarily imply a coincident relationship between a particular deceleration and a particular overall braking torque value. For convenience, much of the following descriptions of FIGS. 3 and 4 refer exclusively to deceleration; however, it is understood that the same descriptions apply to overall braking torque.

Referring back to the flow chart in FIG. 2, the vehicle deceleration represents a first vehicle condition, which is determined in step 48. As described above, other vehicle conditions may be used instead of vehicle deceleration. For example, a number of torque curves could be created that would be used to control the regenerative braking based on different levels of overall braking power. Similarly, the first vehicle condition may be any one of a number of different vehicle conditions, including overall braking force, brake pedal position, suspension load, suspension position, or friction brake capability. As described above in conjunction with FIG. 1, one or more of the various sensors associated with each of the vehicle systems, can send signals to the VSC 18 to provide information about the chosen vehicle condition. The VSC 18 can then use one or more torque curves, such as those shown in FIG. 3, to control the regenerative braking of the vehicle 10.

Returning to FIG. 3, it is seen that control of the regenerative braking follows the regen limit curve for high values of powertrain torque and/or vehicle speed. At some point, control of the regenerative braking begins to deviate from the regen limit and the regenerative braking torque is blended out from some point on the regen limit curve down to zero. Each of the points at which one of the torque curves deviates from the regen limit curve—i.e., points d, e, f and g—represents the first predetermined value, used in step 52 in FIG. 2. As clearly shown in FIG. 3, the point at which the torque curve deviates from the regen limit curve—i.e., the first predetermined value—is based on the first vehicle condition, in this example, vehicle deceleration. Thus, unlike some regenerative braking control systems, the present invention uses different points to begin blending out the regenerative braking torque.

As shown in FIG. 3, the point on the torque curve at which blending begins is also the point of maximum regenerative braking torque. Because the regenerative braking torque is blended out sooner for higher levels of vehicle deceleration, there is an inverse relationship between the vehicle deceleration and the maximum regenerative braking torque. Conversely, because higher levels of vehicle deceleration are blended out sooner, there is a direct relationship between the determined deceleration value and the powertrain torque and/or vehicle speed at which blending begins.

The blending out of regenerative braking torque is shown in FIG. 3 as following a straight line, defined by two points on the torque curve. For example, Torque Curve adhi includes a first Curve Segment dh, which is defined by the maximum regenerative braking torque at Point d, and zero regenerative braking torque at Point h. The VSC 18 can determine when these points are reached, because each of these points corresponds to a vehicle condition, such as a powertrain torque or vehicle speed. Thus, for a determined deceleration of 0.8 g, the VSC 18 may control regenerative braking torque to begin blending out at a vehicle speed of 25 miles per hour (mph), and to end blending at a vehicle speed of 5 mph. Similarly, if the determined vehicle deceleration is 0.4 g, the VSC 18 may begin blending out the regenerative braking at a vehicle speed of 15 mph, while still ending it at a vehicle speed of 5 mph.

As an alternative to using vehicle speed as the second vehicle condition, the VSC 18 may also look to the powertrain torque to determine when to start blending out the regenerative braking torque. For example, if the determined deceleration is 0.8 g, and the vehicle speed is 25 mph, the VSC 18 may further look to the powertrain torque to determine whether to begin blending out the regenerative braking torque. If the powertrain torque at a vehicle speed of 25 mph is only 1,000 Nm, then the blending of regenerative braking torque may be delayed. If, however, the powertrain torque at a vehicle speed of 25 mph is 2,000 Nm, the VSC 18 may control the regenerative braking torque to begin blending.

Although the blending out of regenerative braking torque is shown in FIG. 3 as linear, it may be non-linear. For example, the blending out of the regenerative braking torque can be based on a predetermined percentage of the maximum available regenerative braking torque. In such a case, the blending would occur as a function of the regen limit curve, and would therefore, be non-linear for non-linear portions of the regen limit curve.

In the examples described in conjunction with FIG. 3, the VSC 18 controls the regenerative braking torque in accordance with a single torque curve. Because vehicle conditions change during the braking event, the VSC 18 can be configured to control regenerative braking according to more than one curve, even for a single braking event. When vehicle deceleration is used as the first vehicle condition, one method of using more than one curve to control the regenerative braking in a single braking event, involves using more than one curve only when vehicle deceleration increases during the braking event. Thus, if during the braking event, vehicle deceleration remains constant or decreases, the VSC 18 will control the regenerative braking according to a single curve, such as Curve afhi in FIG. 3. If, however, the vehicle deceleration increases from 0.4 g to 0.8 g during the braking event, the VSC 18 can begin to control the regenerative braking torque according to Curve afhi, and then finish the blending based on Curve adhi.

As shown in FIG. 3, each of the curve segments defining the blending out of regenerative breaking torque—i.e., segments dh, eh, fh, and gh—represent a change in braking torque over some change in powertrain torque and/or vehicle speed. Alternatively, because the blending out of the regenerative braking torque occurs over a period of time during a braking event, each of the curve segments dh, eh, fh and gh, can be represented by a period of time. One method by which the regenerative braking torque can be controlled for different vehicle conditions, such as different vehicle decelerations, is to use a single, constant time period over which to blend the regenerative braking torque. For example, a time period of 6 seconds may be chosen as the value over which the regenerative braking torque is to be blended out, regardless of the determined vehicle deceleration. Thus, points d, e, f and g, would be determined such that the curve segments, dh, eh, fh and gh were each completed in a time period of 6 seconds.

Figure 4:
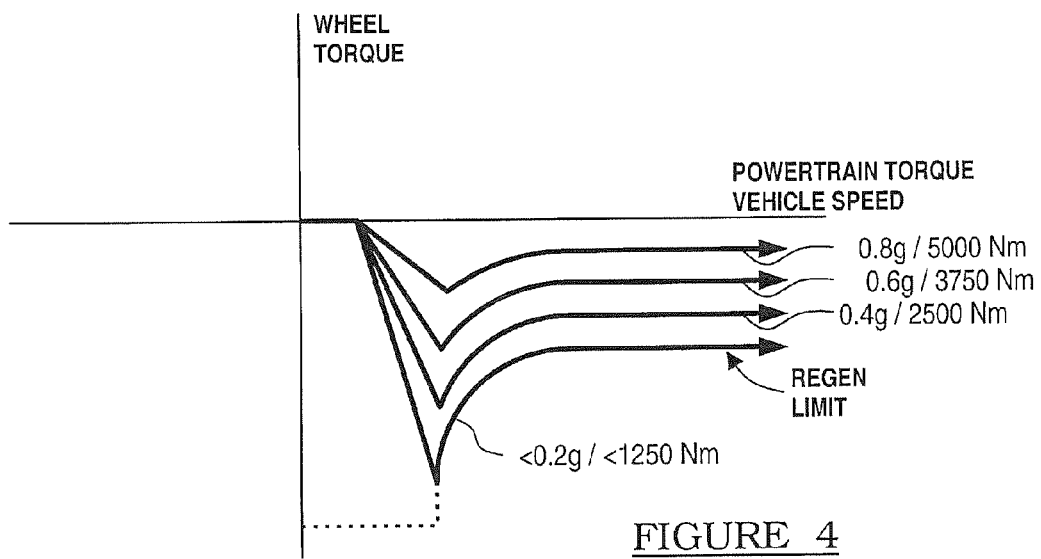
FIG. 4 shows a different group of torque curves used to control regenerative braking in accordance with the present invention.

Another way to control the blending out of the regenerative braking torque is shown in FIG. 4. In FIG. 4, only one of the torque curves follows the regen limit curve—i.e., the torque curve used for vehicle decelerations less than 0.2 g (or overall braking torques less than 1250 Nm). At higher vehicle decelerations (or overall braking torques), the entire torque curve is shifted up, such that the point at which the blending out of the regenerative torque begins, is constant, regardless of the vehicle deceleration (or overall braking torque). Although the curves shown in FIGS. 3 and 4 are based on different levels of vehicle deceleration (or overall braking torque), similar curves could be generated based on a different vehicle condition, such as the brake pedal position. The brake pedal position may be used directly, or it may be related to other vehicle conditions, such as overall braking power or overall braking force. Similarly, torque curves could be generated using different torque curves for different suspension loads and/or suspension positions.

Figure 5:
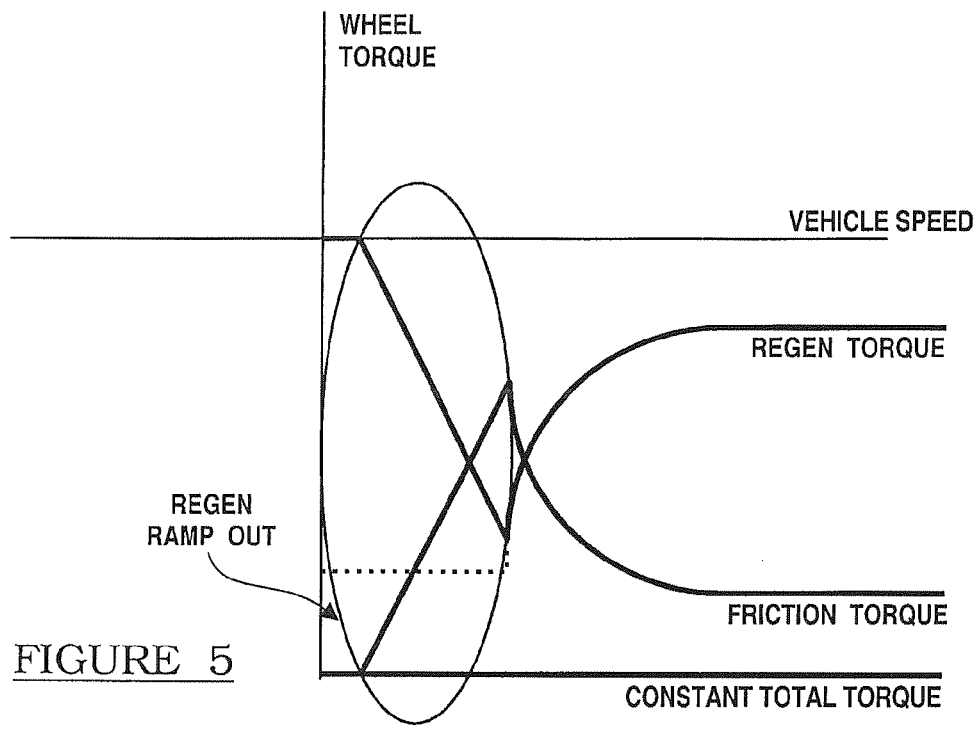
FIG. 5 shows a regenerative torque curve and a friction torque curve controlled together to create a constant total torque curve.

As described above, the first vehicle condition determined by the VSC 18 can also be a friction brake capability. FIG. 5 shows three torque curves: a regen torque curve (similar to the torque curves shown in FIGS. 3 and 4), a friction torque curve (representing a torque curve for a friction braking system, such as the friction braking system 12), and a constant total torque curve (representing the sum of the regen torque curve and the friction torque curve).

In the example shown in FIG. 5, the regenerative braking torque is controlled in a fashion similar to that described in FIGS. 3 and 4; in addition, the friction braking torque is also controlled, such that it increases to match the decreasing regenerative braking torque. This area is shown in FIG. 5 in the oval labeled "Regen Ramp Out." Matching the blending out of the regenerative braking torque with a corresponding blending in of the friction braking torque may be difficult or impossible when the friction braking capability is reduced. For example, if a friction braking system experiences of a loss of boost, or the loss of a hydraulic circuit, it may not be possible to control the friction braking torque in accordance with the curve shown in FIG. 5.

Figure 6:
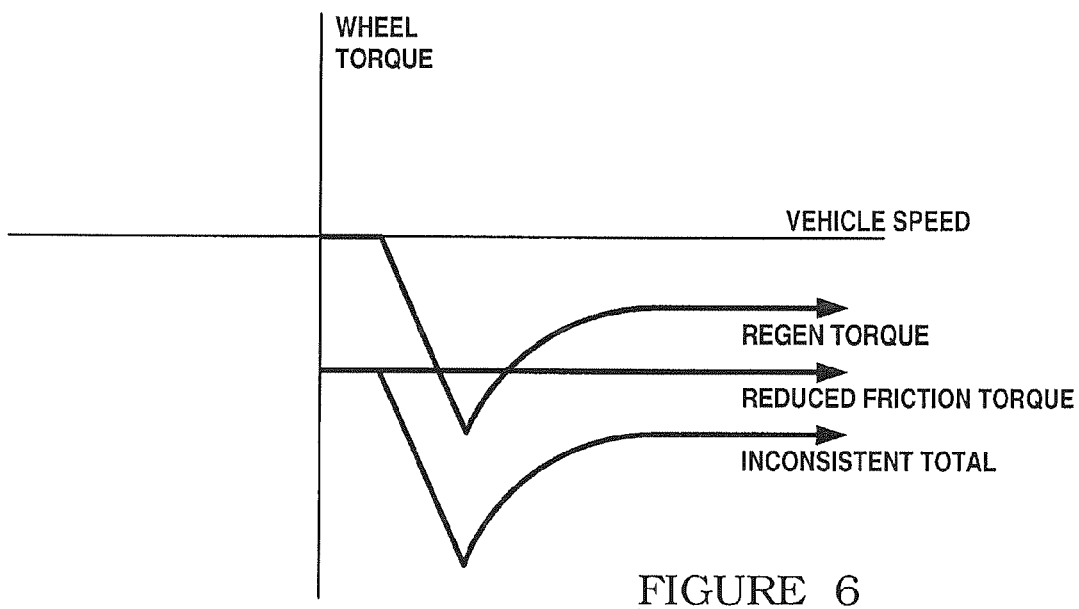
FIG. 6 shows a regenerative torque curve and a reduced capability friction torque curve, which combine to create an inconsistent total torque curve.

FIG. 6 illustrates the situation in which the regenerative braking torque follows a curve similar to that shown in FIGS. 3 and 4, but the capability of the friction braking system is reduced and no longer independently controllable. The addition of the normal regenerative braking torque and the reduced capability friction torque, produces an inconsistent total torque. Such an inconsistent total torque may require a vehicle operator to compensate, for example, by adjusting the brake pedal pressure. The present invention provides a solution to this, by blending the regenerative braking torque as described above.

Figure 7:
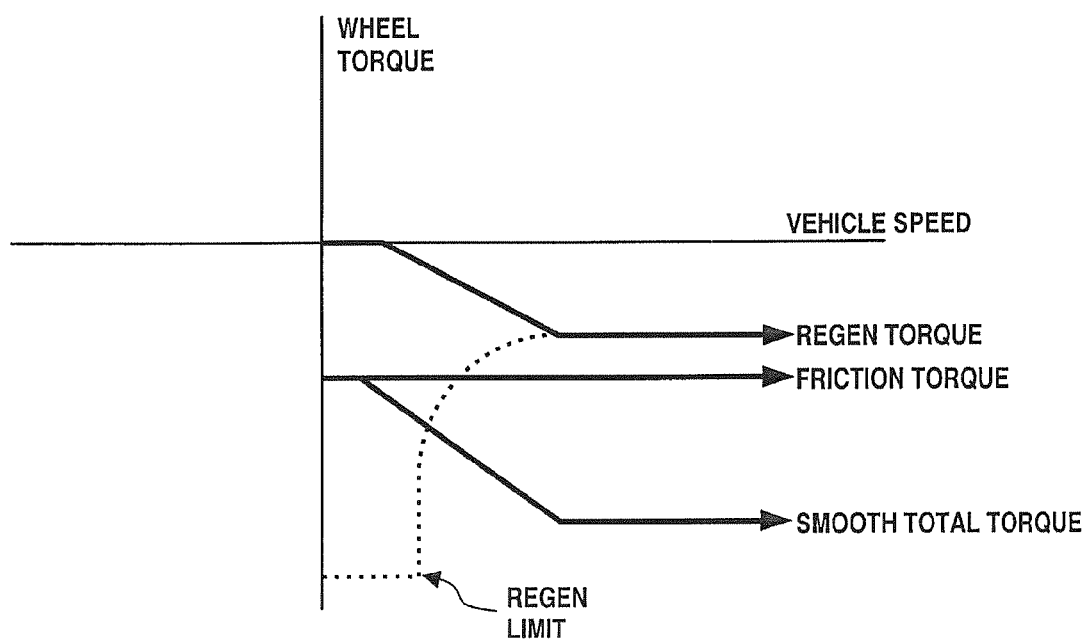
FIG. 7 shows a regenerative torque curve combined with a reduced-capability friction torque curve, resulting in a smooth total torque curve.

FIG. 7 illustrates the present invention applied to a situation where the friction braking torque capability is reduced. In this situation, the first vehicle condition, which is determined in step 48 in FIG. 2, is the friction brake capability. In this example, the second vehicle condition is the vehicle speed, indicated by the abscissa in the graph in FIG. 7. The VSC 18 can reduce the regenerative braking torque to zero, beginning at a predetermined value of the vehicle speed which is based on the reduced friction braking capability—i.e., based on the first vehicle condition.

As shown in FIG. 7, the regenerative braking torque is blended out gradually and smoothly, such that the total braking torque is also smooth, and has no abrupt changes. This provides an even, consistent feel for the vehicle operator, and eliminates the need for the vehicle operator to quickly react to compensate for a sharp change in the braking torque. For the example shown in FIG. 7, the first predetermined value—i.e., the vehicle speed at which the regenerative braking torque blending begins—may be the same for any type of reduced friction braking capability. Alternatively, the VSC 18 may be configured to use different values depending on the type and severity of the reduced friction braking capability.

While the best mode for carrying out the invention has been described in detail, those familiar with the art to which this invention relates will recognize various alternative designs and embodiments for practicing the invention as defined by the following claims.

The invention claimed is:

1. A method for controlling regenerative braking in a vehicle having a regenerative braking system, the method comprising:
   determining a first vehicle condition when the vehicle is braking;
   determining a first predetermined value corresponding to the first vehicle condition;
   determining a second vehicle condition; and
   reducing regenerative braking torque to zero beginning when the second vehicle condition reaches the first predetermined value, the regenerative braking torque being reduced to reach zero at a second predetermined value, the second predetermined value being based on the first vehicle condition.

2. The method of claim 1, further comprising controlling regenerative braking torque according to a predetermined torque curve based on the first vehicle condition, the predetermined torque curve including a first point and a second point, the first point being defined by a maximum regenerative braking torque and the first predetermined value, the second point being defined by zero regenerative braking torque and the second predetermined value.

3. The method of claim 2, wherein the first vehicle condition is vehicle deceleration or overall braking torque, and the regenerative braking torque is controlled according to at least one curve chosen from a plurality of torque curves, each of the torque curves corresponding to the first vehicle condition and having corresponding first and second points, and wherein there is an inverse relationship between the first vehicle condition and the maximum regenerative braking torque.

4. The method of claim 3, wherein the regenerative braking torque is controlled according to a single torque curve when the first vehicle condition remains constant or decreases during braking, and wherein the regenerative braking torque is controlled according to more than one torque curve when the first vehicle condition increases during braking.

5. The method of claim 3, wherein there is a direct relationship between the first vehicle condition and the first predetermined value.

6. The method of claim 3, wherein the first predetermined value is approximately constant for each of the torque curves.

7. The method of claim 3, wherein the distance between corresponding first and second points can be represented by a time, and wherein the time is approximately constant for each of the torque curves.

8. The method of claim 2, wherein the first and second points define a first curve segment, the first curve segment defining regenerative braking torque values equal to a predetermined percentage of a maximum available regenerative braking torque.

9. The method of claim 1, the vehicle also having a friction braking system, wherein the first vehicle condition includes one of friction brake capability, vehicle deceleration, overall braking torque, overall braking power, overall braking force, brake pedal position, suspension load, and suspension position.

10. The method of claim 1, wherein the second vehicle condition is a vehicle speed, a powertrain torque, or a combination of vehicle speed and powertrain torque.

11. The method of claim 1, wherein the first predetermined value is a first vehicle speed and the second predetermined value is a second vehicle speed.

12. A method for controlling a vehicle having a regenerative braking system, the method comprising:
- determining when a vehicle operator commands vehicle braking;
- using at least regenerative braking to reduce a speed of the vehicle when the operator commands vehicle braking;
- determining a first vehicle condition when the vehicle is braking, the first vehicle condition defining a first predetermined value;
- determining a second vehicle condition; and
- reducing regenerative braking torque when the second vehicle condition reaches the first predetermined value, the regenerative braking torque being reduced to reach zero at a second predetermined value, the second predetermined value being based on the first vehicle condition.

13. The method of claim 12, the vehicle also having a friction braking system, wherein the first vehicle condition includes one of friction brake capability, vehicle deceleration, overall braking torque, overall braking power, overall braking force, brake pedal position, suspension load, and suspension position.

14. The method of claim 12, wherein the second vehicle condition is a vehicle speed, a powertrain torque, or a combination of vehicle speed and powertrain torque.

15. The method of claim 12, wherein the first predetermined value is a first vehicle speed and the second predetermined value is a second vehicle speed.

* * * * *